United States Patent [19]
Ladd et al.

[11] Patent Number: 5,462,655
[45] Date of Patent: Oct. 31, 1995

[54] VEHICLE CONTAINMENT MAT WITH VACUUM RECOVERY AND RECYCLE MEANS

[76] Inventors: Michael Ladd; June E. Ladd, both of 2602 E. Bluefield Ave., Phoenix, Ariz. 85032; Larry Hinebaugh, P.O. Box 6252, Cedar City, Utah 84721; Jack E. Hennessy; Susan C. Hennessy, both of 15887 Trevino Dr., Fountain Hills, Ariz. 85032

[21] Appl. No.: 124,167

[22] Filed: Sep. 20, 1993

[51] Int. Cl.$^6$ .................................................. B01D 36/00
[52] U.S. Cl. ................... 210/167; 210/175; 210/195.1; 210/248; 210/252; 210/257.2; 210/258; 210/251; 210/360.1; 210/901; 244/134 C; 405/128; 405/52; 588/249
[58] Field of Search ................ 244/134 RC, 134 C; 210/170, 167, 175, 194, 195.1, 195.2, 248, 251, 252, 257.2, 258, 259, 901, 360.1; 405/36, 128, 37, 129, 52, 270, 55, 56; 588/249

[56] References Cited

U.S. PATENT DOCUMENTS

| | | | |
|---|---|---|---|
| 3,661,227 | 5/1972 | Robel et al. | 184/106 |
| 4,679,590 | 7/1987 | Hergenroeder | 137/602 |
| 5,090,588 | 2/1992 | Van Romer et al. | 220/573 |
| 5,099,872 | 3/1992 | Tarvin et al. | 137/312 |
| 5,128,189 | 7/1992 | Bartlett | 428/71 |

*Primary Examiner*—Robert A. Dawson
*Assistant Examiner*—Robert James Popovics
*Attorney, Agent, or Firm*—John Edward Roethel

[57] ABSTRACT

A fluid recapture system collects residual waste fluids generated during airplane washing or de-icing procedures and separates and recycles these fluids to prevent contamination of storm water drainage and sewer systems and ground water supplies. The fluid recapture system includes a containment mat, a triangular berm with a resilient foam center surrounding the containment mat, a vacuum system located on the containment mat and recycling apparatus connected to the vacuum system. The recycling apparatus includes a pump for withdrawing fluid from the containment mat through the vacuum system and into the recycling apparatus. The pump withdraws the water from the containment mat and sends it to an effluent storage tank. From the effluent storage tank, the water is cycled through a hydro cycle machine, a reverse osmosis tank and finally into a clean water storage tank. The clean water can be reused in the airplane washing procedure. In the de-icing embodiment, the effluent is sent to a distillation unit and the water is removed from the ethylene glycol so that both components can be recycled.

27 Claims, 6 Drawing Sheets

VEHICLE CONTAINMENT MAT WITH VACUUM RECOVERY AND RECYCLE MEANS

This invention relates to a fluid recapture system, and more particularly to a fluid recapture system for use with aircraft that includes a containment mat for collecting waste fluids generated during airplane washing or de-icing, a vacuum system for removing the fluids from the containment mat and a recycling apparatus for separating the fluids for reuse. This apparatus also can be used in connection with washing, cleaning or paint stripping from other vehicles such as automobiles, trucks or even simply a collection of equipment or parts.

BACKGROUND OF THE INVENTION

Since the advent of commercial aviation in the early twentieth century, there has been little concern from an environmental standpoint with the waste products generated during the washing of aircraft. Airplanes are generally washed on a daily basis at a washing station at the airport or the aircraft storage facility. An airplane is hand washed by maintenance personnel using soap and water, long-handled brushes and high pressure water hoses. The dirt removed from the airplane along with the soap and water collects on the floor surface of the washing location and is typically drained into the local sewer system or directly runs off as ground water.

De-icing of airplanes, required prior to takeoff during cold weather, likewise introduces chemicals and other contaminants into the sewer system and local ground water. An airplane taxis to the de-icing station and a mixture of glycol and water is sprayed with high pressure hoses onto the airplane body and wings to eliminate ice from the airplane. The residual glycol and water mixture that fall to the ground eventually drains into the sewer system or local ground water.

In 1990 the U.S. Environmental Protection Agency adopted regulations designed to eliminate storm water discharges associated with industrial activity. Because of these regulations, it became necessary to minimize the environmental impact from the residual waste fluids generated during both airplane washing and aircraft de-icing procedures. These regulations prohibit these residual waste fluids in an untreated condition from being introduced into storm water drainage, and in some cases the local sewer systems.

U.S. Pat. No. 5,090,588 (Van Romer) discloses a portable containment mat that collects pesticides and other toxic materials that might otherwise contaminate ground water when the pesticides are loaded into a crop dusting airplane. The airplane is taxied onto the containment mat which has deformable upstanding sidewalls. After loading the pesticides, the airplane is taxied off the containment mat and the sidewalls spring back up to contain any spilled pesticides. While this design functions to contain spilled pesticides on the containment mat, there is no apparatus provided to remove the pesticides from the mat or to recycle the contained materials for reuse.

It is an object of the present invention to provide a fluid recapture system that collects residual waste fluids from airplane washing or aircraft de-icing procedures and recycles these fluids for separation and reuse.

It is a feature of the present invention to provide a fluid recapture system that includes a containment mat that collects residual waste fluids from airplane washing or de-icing, a vacuum system that removes the fluids from the containment mat and a recycling apparatus that separates the fluids for reuse.

It is an advantage of the present invention that residual waste fluids generated during airplane washing or de-icing procedures are captured and recycled thus preventing these fluids from entering the storm water drainage or sewer system or from contaminating ground water supplies.

Other objects, features and advantages of the present invention will become apparent from a consideration of the following detailed description.

SUMMARY OF THE INVENTION

A fluid recapture system collects residual waste fluids generated during airplane washing or de-icing procedures and separates and recycles these fluids to prevent contamination of storm water drainage and sewer systems and ground water supplies. The fluid recapture system includes a containment mat, a triangular berm with a resilient foam center surrounding the containment mat, a vacuum system located on the containment mat and recycling apparatus connected to the vacuum system. The recycling apparatus includes a vacuum for withdrawing fluid from the containment mat and a pump in the vacuum system that pumps the withdrawn fluid into the recycling structure. The vacuum withdraws the water from the containment mat and pumps the effluent into storage tanks. From the effluent storage tank, the water is cycled through a hydro cycle machine, a reverse osmosis tank and finally into a clean water storage tank. The clean water can be reused in the airplane washing procedure. In the de-icing embodiment, the effluent is sent to a distillation unit and the water is removed from the ethylene glycol so that both components can be recycled.

DETAILED DESCRIPTION OF THE PREFERRED EMBODIMENTS

Figure 1:
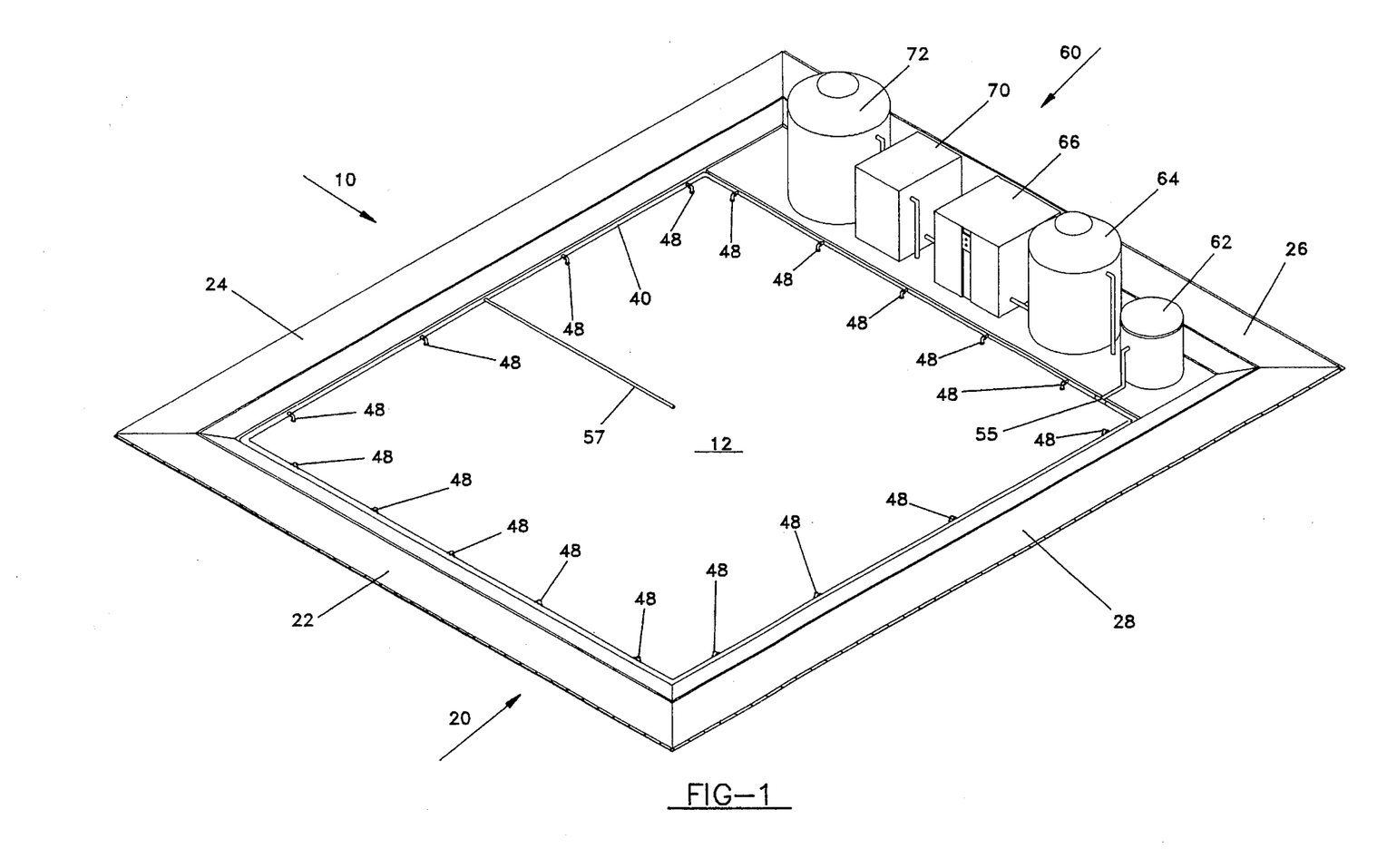
FIG. 1 shows an isometric view of the fluid recapture system of the present invention.

The fluid recapture system of the present invention is shown generally at 10 in FIG. 1. The fluid recapture system 10 comprises a containment mat 12, preferably in a generally rectangular configuration and completely surrounded by a berm 20. The containment mat 12 should be a fluid impermeable material that is highly resistant to toxic and other materials that are used in airplane washing and de-icing procedures. In the preferred embodiment, the containment mat 12 is a synthetic plastic material such as COOL- GUARD® 78, made by Cooley Incorporated, Pawtucket, R.I. In the most preferred embodiment, this material is a polyester woven fabric material with face and back coatings of a highly resistant, tri-polymer alloy of polyvinyl chloride, ELVALOY® (a registered trademark of DuPont Company) polymers and chlorinated polyethylene ELVALOY® polymers area a class of polymers sometimes called KEE, which stands for ketone, ethylene and ester. Typically, ELVALOY® polymers are prepared by the terpolymerization of ethylene, carbon monoxide and either a vinyl ester or an acrylic ester. Chlorinated polyethylene is a polymer prepared by the polymerization of ethylene followed by chlorination.

Figure 2:
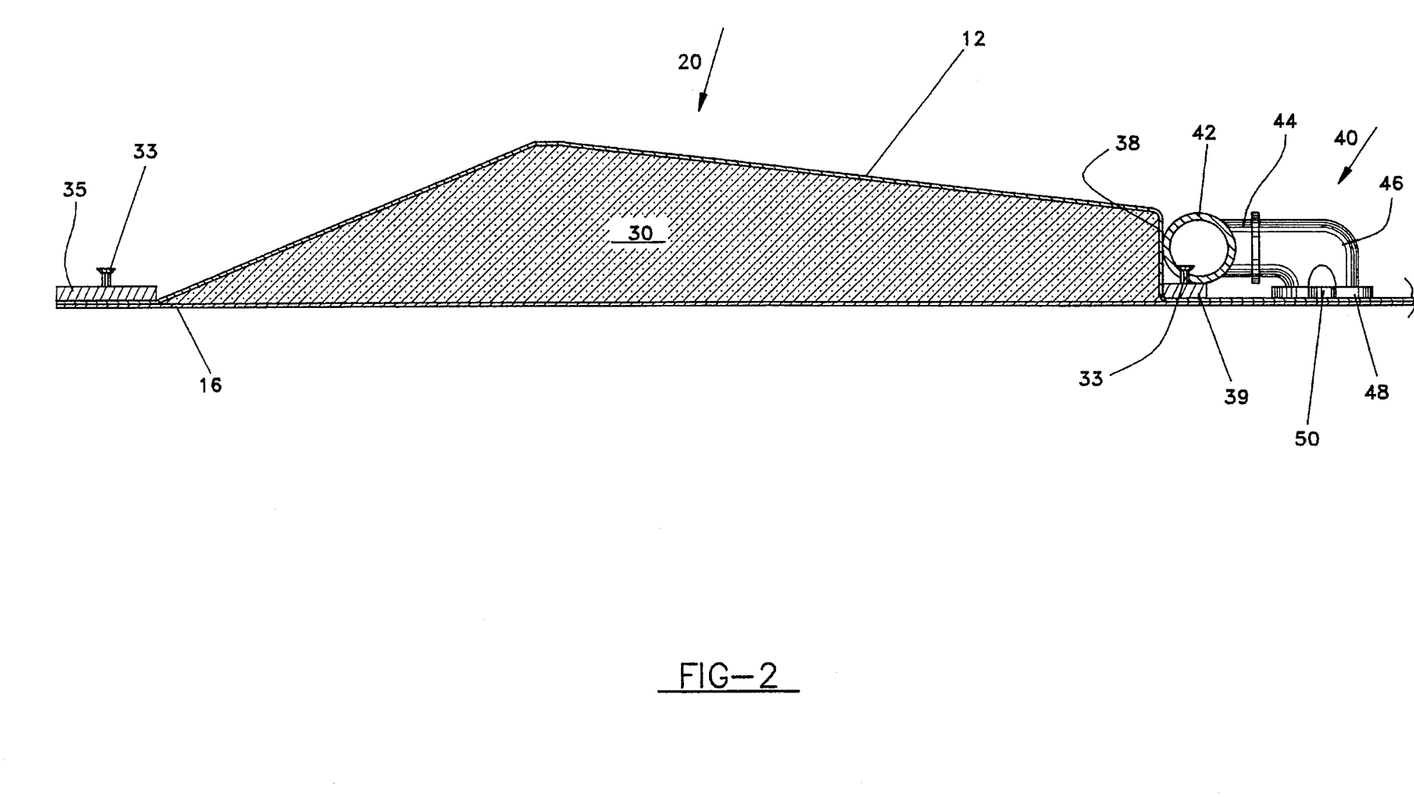
FIG. 2 shows a cross sectional view of a portion of the berm, vacuum system and containment mat used in the fluid recovery system of the present invention.
Figure 3:
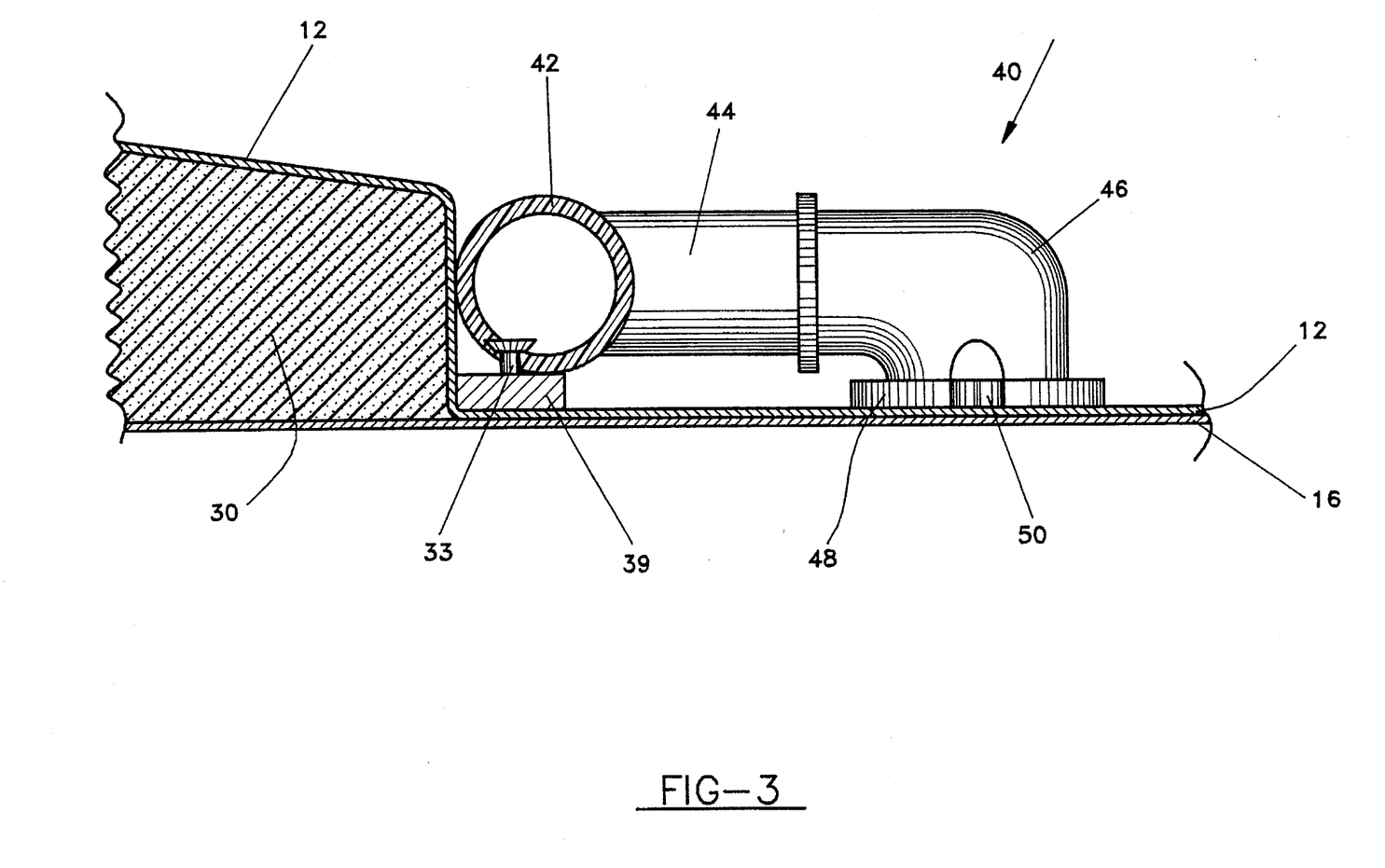
FIG. 3 shows an enlarged cross-sectional view of a portion of the berm and the associated vacuum removal lines of the containment mat of the present invention.

As shown in FIG. 2, the containment mat 12 rests on a base material 16. The base material 16 is preferably a geotextile material such as QuLine made by Wellman, Inc. located in Commerce, Calif. The containment mat 12 can be laid down over whatever material comprises the existing terrain, although in the preferred embodiment, the containment mat 12 is put down over existing concrete or asphalt surfaces at the airport facility.

Referring back to FIG. 1, the berm 20 preferably is configured as a rectangle having a front side 22, a left side 24, a rear side 26 and a right side 28 and the berm 20 has a generally triangular in cross section. Positioned adjacent the rear side 26 of the berm 20 is the recycling apparatus 60 which functions to treat and separate for reuse the fluid wastes removed from the containment mat 12.

FIG. 2 shows in detail the elements of the berm 20. Each section of the berm 20 includes a foam core 30 which, in the preferred embodiment, is a highly resilient, nonflammable foam material that resists degradation by the contaminants and toxic materials that may be present in the residual wastes from the washing fluids or de-icing fluids used on aircraft. One suitable foam core 30 is Model S350 made by Schlobohm Company located in Rancho Dominguez, Calif. The foam core 30 rests on base material 16 and is covered over by the containment mat 12.

A preferred configuration of the berm 20 is generally triangular one piece foam core 30 with the inside portion of the foam core 30 being approximately twice as wide as the outside portion of the foam core 30. The outer end of the outside portion of the foam core 30 sits adjacent an outside batten bar 35 to secure the berm 20 to the ground or floor of the location at which the fluid recapture system 10 is set up. The inner end of the inside foam core 30 ends in an upstanding inside edge 38 adjacent to which is an inside batten bar 39 to secure the berm 20 to the ground or floor. Any suitable device such as screws 33 can be used to secure the batten bars to the ground or floor.

Figure 4:
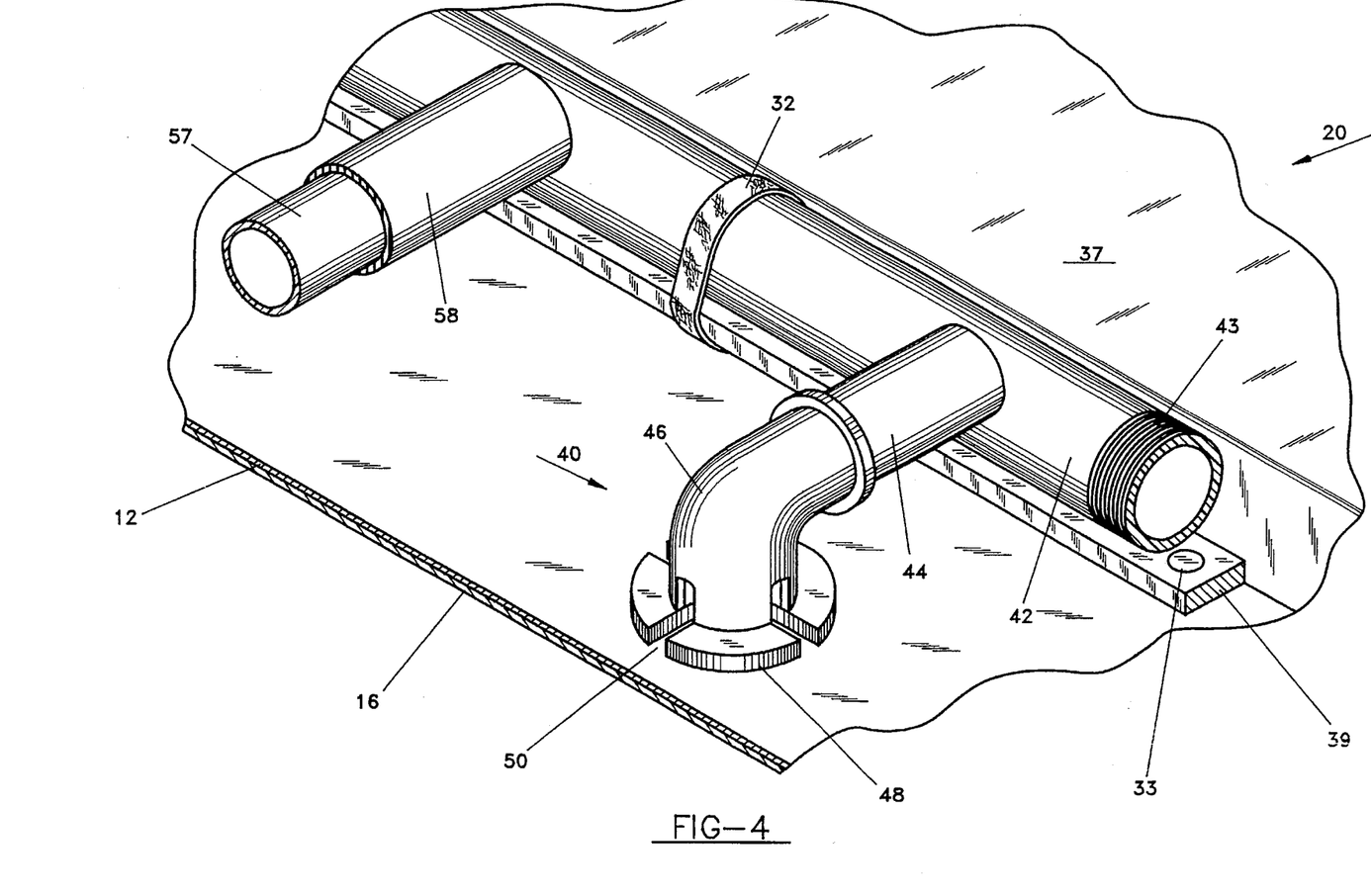
FIG. 4 shows an enlarged isometric view of a portion of the associated vacuum removal line and pickup head of the vacuum system of the present invention.

The vacuum system 40 is positioned around the inside perimeter of the berm 20 adjacent to the inside edge 38 of the foam core 30. Vacuum hose 42 is continuously positioned around the perimeter of the containment mat 12 and the vacuum system 40 is joined to the recycling apparatus 60 at a suitable T location 55 as shown in FIG. 1. As shown in FIG. 4, the vacuum hose 42 can be configured from a plurality of hose sections secured together by hose connectors 43. The vacuum hose is fastened to the inside batten bar 39 at suitable locations along the length thereof by any suitable means, such as the hose fastener 32 which can be a self-adhering hook-and-loop fastener such as VELCRO.

At a plurality of locations along the length of the vacuum hose 42, there are provided pickup heads 48 connected to the vacuum hose 42 in a T configuration by means of a connector 44 and an elbow 46. Each pickup head 48 has a plurality of openings 50 which allows fluids lying of the containment mat 12 to be drawn into the pickup head 48 when a vacuum is applied to the vacuum hose 42. The preferred material for the vacuum system 40 is noncrushable plastic pipe.

As shown in FIGS. 1 and 4, there is also provided a center hose pickup 57 which extends from the vacuum hose 40 into the center region of the containment mat 12. This center hose pickup 57 can be of any suitable length to allow the opening at the end of the center hose pickup 57 to be positioned in any low spot on the containment mat 12 at which fluids may collect. In the preferred embodiment, the center hose pickup 57 can be any suitable flexible hose material surrounded by a cover 58 which protects the center hose pickup 57 from any deleterious effects of the fluids collecting on the surface of the containment mat 12.

Figure 5:
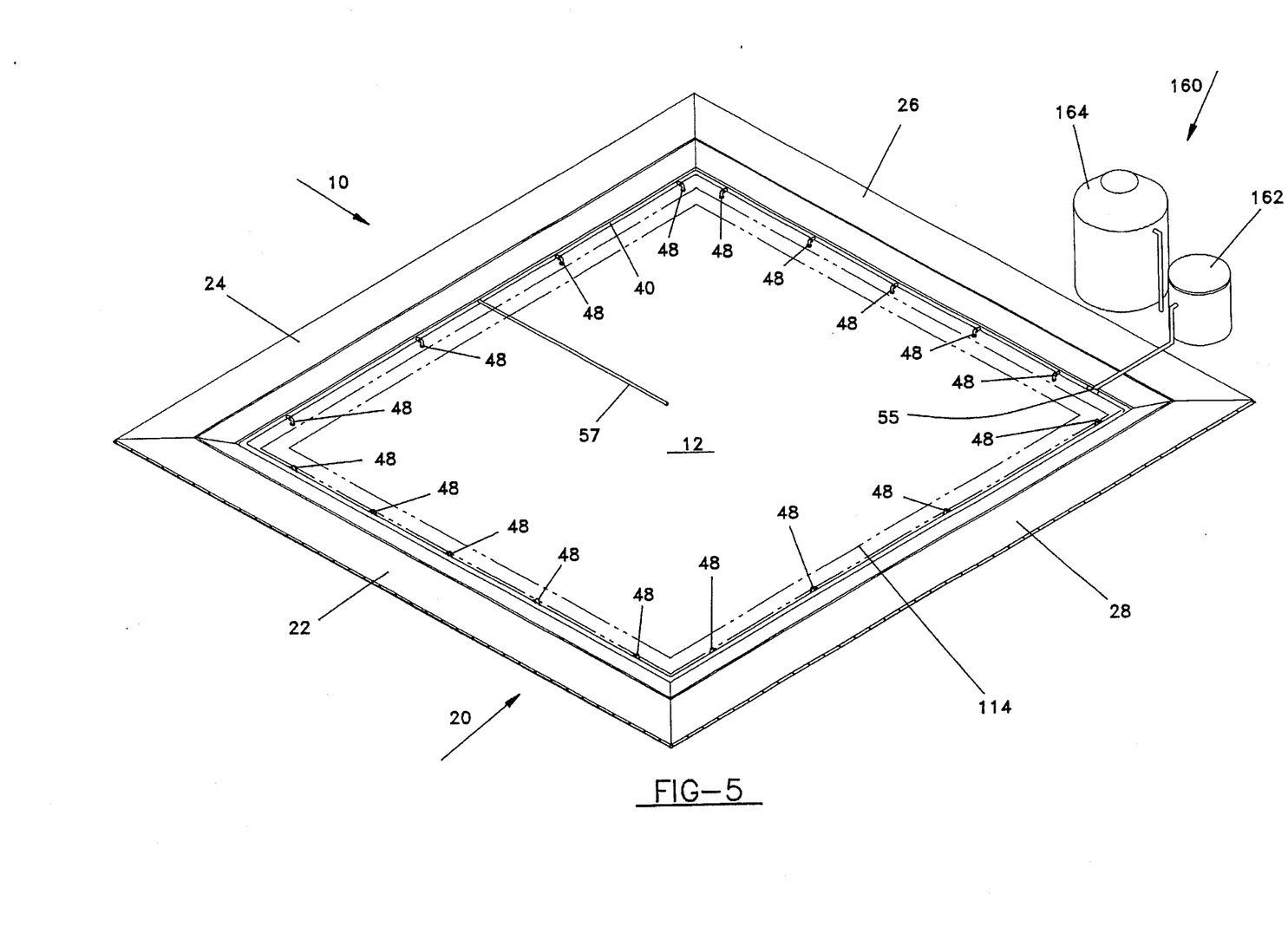
FIG. 5 shows an isometric view of an alternative embodiment of the fluid recapture system of the present invention.

The recycling apparatus 60 is located adjacent one side of the berm 20, such as the rear side 26. The recycling apparatus 60 can be located either on the surface of the containment mat 12 as shown in FIG. 1 or off the surface of the containment mat 12 as shown in FIG. 5. The inlet to the recycling apparatus 60 is connected to the vacuum system 40 at location 55 by any suitable conventional arrangement. The recycling apparatus 60 includes a plurality of stations for treating, separating and handling the recaptured fluid wastes removed from the containment mat 12 by the vacuum system 40.

A vacuum pump 62 is connected to the end of the vacuum system 40 and effects the pumping of the residual fluid wastes through the vacuum system 40. The vacuum pump 62 passes the fluid wastes into an effluent storage tank 64 where they are temporarily stored. From the effluent storage tank 64 the fluid wastes pass into a hydro cycle machine 66 which separates the water from the other fluids that may be present, such as the soap and dirt remaining from the washing procedures. In the preferred embodiment, the hydro cycle machine 66 is a Model #AV-2, manufactured by Thomas Enterprises in Bakersfield, Calif. The water separated in the hydro cycle machine 66 passes into a reverse osmosis tank 70 in which residual impurities are removed. In the preferred embodiment, the reverse osmosis tank 70 is a Model #AV-2RO manufactured by Thomas Enterprises in Bakersfield, Calif. The final product leaving the reverse osmosis tank 70 is contained in a clean water storage tank 72. At this stage the water is clean and spot free; an efficient use for this water is as a source of water for airplane washing.

In use, an airplane is taxied onto the containment mat 12. As the airplane rolls over the berm 20, the foam core 30 will deform under the weight of the airplane. Because the berm 20 is wedge-shaped, if there is a build up of waste fluids on the containment mat 12 that the vacuum system 40 has not yet removed, the berm 20 tends to channel the fluids back onto the mat 12 rather than just allowing the fluids to spill over the edge of the mat 12.

After passing over the berm 20, the airplane is positioned on the center of the containment mat 12 and either washing or de-icing can occur. The berm 20 springs back to shape after the airplane has passed over and any fluids falling on the containment mat 12 during washing or de-icing are contained thereon by the height of the berm 20.

During the processing of the airplanes, the fluids collecting on the containment mat 12 can be removed therefrom by the vacuum system 40. The activation of the vacuum pump 62 draws the waste fluids on the containment mat 12 into the vacuum hose 42 by means of the openings 50 in the pickup heads 48 located at suitable positions around the perimeter of the containment mat 12. The fluids entering the vacuum hose 42 are pumped into the vacuum pump 62 and from there are passed into the effluent storage tank 64 for storage or further processing.

At an appropriate point in time, the fluids in the effluent storage tank 64 are pumped into the hydro cycle machine 66 where initial separation occurs. The water is separated from the other fluid materials in the hydro cycle machine 66. Then the water undergoes an additional treatment in the reverse osmosis tank 70 where residual impurities are removed and clean water leaving the reverse osmosis tank 70 can be stored for reuse in the clean water storage tank 72. This clean water is most preferably used as a water source for washing airplanes.

Figure 6:
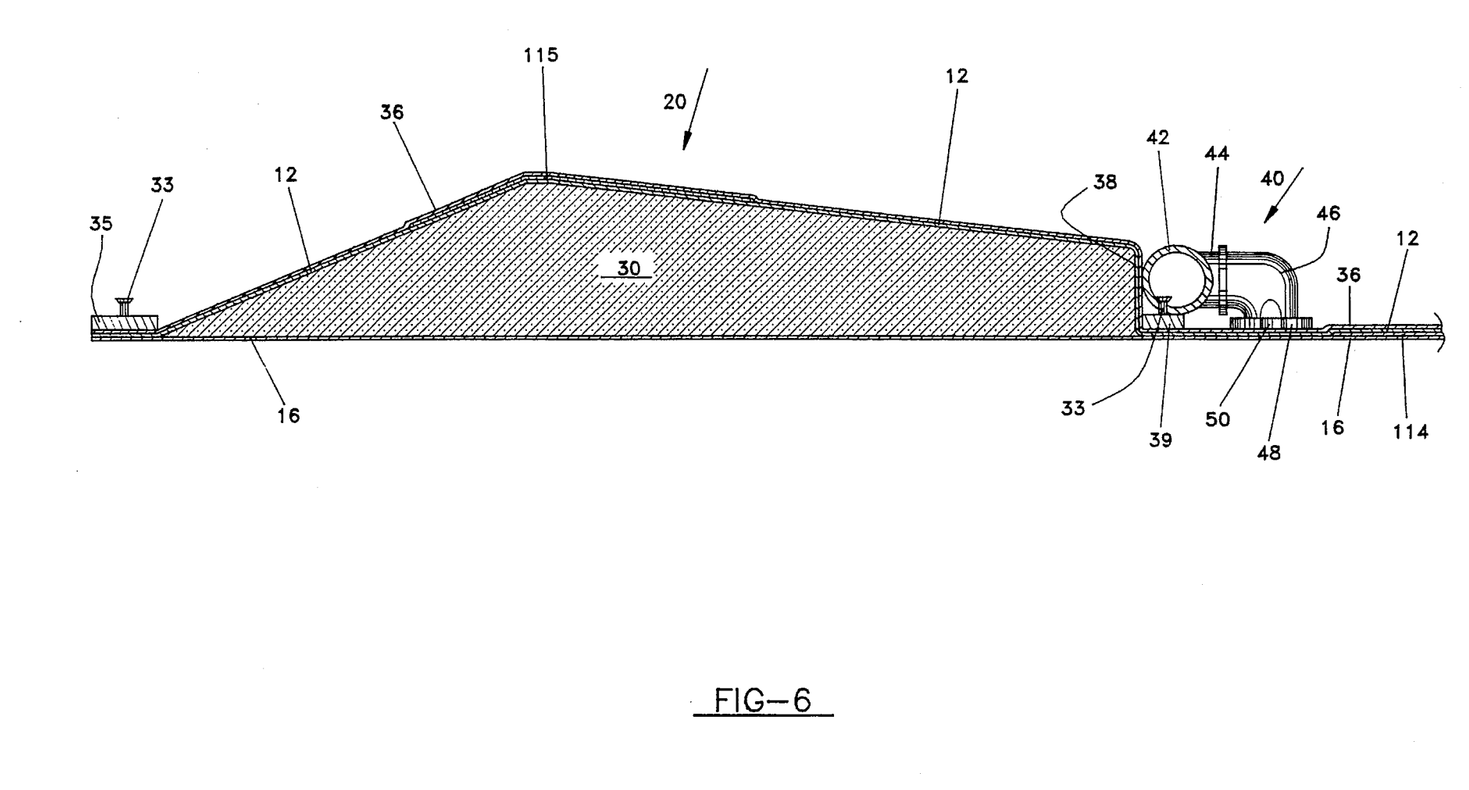
FIG. 6 shows a cross sectional view of a portion of the berm, vacuum system and containment mat used in the alternate embodiment of the fluid recovery system of the present invention.

FIGS. 5 and 6 show the preferred layout of the fluid recapture system configured for removing waste fluids generated during airplane de-icing. As shown in FIG. 5, the de-icing recycling apparatus 160 uses only a vacuum pump 162 and an effluent storage tank 164. The separation and recycling of the waste fluids generated during airplane de-icing can done at a facility remote from the airport facility. Alternatively, separation and recycling can be provided on-site. The containment mat 12 and the berm 20 have the same components as those used in the airplane washing facility with the addition of a mat heater 114 in between the containment mat 12 and the base material 16 as shown in FIGS. 5 and 6. Because de-icing occurs during periods of freezing weather, it is desirable to add a mat heater 114 around the periphery of and under the containment mat 12 to prevent the waste fluids from freezing. It is also desirable as shown in FIG. 6 to add a berm heating element 115 around the periphery and along the crest of the berm 20 to also prevent any waste fluids from freezing on the crest of the berm 20.

FIG. 6 also shows the addition of a replacement sheet 36 that can be added to the system of the present invention in the event that the containment mat 12 becomes torn during use. In this instance, instead of replacing the entire containment mat 12, a replacement sheet 36 of the same material as the containment mat 12 can be overlaid to maintain the fluid impermeability of the system.

The fluid recapture system of the present invention offers an operator a tremendous amount of flexibility. The recycling apparatus is all located above ground which eliminates the need for any digging or modifications to existing plant structures thus preventing underground leakage of hazardous waste. The containment mat and berm assembly can be rolled up and moved from one location to another.

While the invention has been illustrated with respect to several specific embodiments thereof, these embodiments should be considered as illustrative rather than limiting. Various modifications and additions may be made and will be apparent to those skilled in the art. Accordingly, the invention should not be limited by the foregoing description, but rather should be defined only by the following claims.

What is claimed is:

1. A fluid recapture system for use with vehicle washing procedures comprising:
    a) a containment mat;
    b) a berm surrounding the containment mat, the berm including a foam core;
    c) a vacuum system located on the containment mat, the vacuum system comprising a vacuum hose and at least one pickup head attached to the vacuum hose, the pickup head being in fluid communication with the surface of the containment mat; and
    d) recycling apparatus connected to the vacuum system, the recycling apparatus including a vacuum pump for withdrawing fluid from the containment mat through the vacuum system and into the recycling apparatus.

2. The fluid recapture system of claim 1 wherein the containment mat comprises a fluid impermeable material mounted on a base material, the fluid impermeable material being substantially chemically inert to materials used in the washing process.

3. The fluid recapture system of claim 2 wherein the containment mat is a tri-polymer alloy of polyvinyl chloride, ELVALOY® and chlorinated polyethylene and the base material is a polyester fabric material.

4. The fluid recapture system of claim 1 wherein the foam core is generally triangular, has an inner core portion and an outer core portion and the inner core portion is approximately twice as wide as the outer core portion.

5. The fluid recapture system of claim 1 wherein the foam core is covered with a fluid impermeable plastic outer cover.

6. The fluid recapture system of claim 5 wherein the containment mat, the foam core and the outer cover are secured in place by an inside batten bar located adjacent the inner core portion and an outside batten bar located adjacent the outside core portion.

7. The fluid recapture system of claim 1 wherein the vacuum hose is positioned around a perimeter of the containment mat adjacent the berm and a plurality of pickup heads are attached to the vacuum hose, each pickup head having at least one opening therein in fluid communication with the containment mat.

8. The fluid recapture system of claim 7 further including a center hose pickup attached to the vacuum hose, the center hose pickup including an open end so that the center hose pickup can be positioned at any suitable location on the containment mat.

9. The fluid recapture system of claim 1 wherein the recycling apparatus includes an effluent storage tank, a water separation machine, a water purification machine and a clean water storage tank so that fluids removed from the containment mat can be separated for reuse.

10. A fluid recapture system for use with vehicle de-icing procedures comprising:
    a) a containment mat including a mat heater positioned around the periphery of and under the containment mat to prevent fluids contained thereon from freezing;
    b) a berm surrounding the containment mat;
    c) a vacuum system located on the containment mat; and
    d) fluid waste storage apparatus connected to the vacuum system, the fluid waste storage apparatus including a vacuum pump for withdrawing fluid from the containment mat through the vacuum system and into the fluid waste storage apparatus.

11. The fluid recapture system of claim 10 wherein the containment mat comprises a fluid impermeable material mounted on a base material, the fluid impermeable material being substantially chemically inert to materials used in the de-icing process.

12. The fluid recapture system of claim 11 wherein the containment mat is a tri-polymer alloy of polyvinyl chloride, ELVALOY® and chlorinated polyethylene and the base material is a polyester fabric material.

13. The fluid recapture system of claim 10 wherein the berm comprises a generally triangular foam core.

14. The fluid recapture system of claim 13 wherein the foam core has an inner core portion and an outer core portion and the inner core portion is approximately twice as wide as the outer core portion.

15. The fluid recapture system of claim 13 wherein the foam core is covered with a fluid impermeable plastic outer cover.

16. The fluid recapture system of claim 15 wherein the containment mat, the foam core and the outer cover are secured in place by an inside batten bar located adjacent the inner core portion and an outside batten bar located adjacent the outside core portion.

17. The fluid recapture system of claim 10 wherein the vacuum system comprises a vacuum hose positioned around a perimeter of the containment mat adjacent the berm and a plurality of pickup heads attached to the vacuum hose, each pickup head having at least one opening therein in fluid communication with the containment mat.

18. The fluid recapture system of claim 17 further including a center hose pickup attached to the vacuum hose, the center hose pickup including an open end so that the center hose pickup can be positioned at any suitable location on the containment mat.

19. The fluid recapture system of claim 10 wherein the fluid waste storage apparatus includes an effluent storage tank so that waste fluids removed from the containment mat can be stored for later separation and recycling.

20. The fluid recapture system of claim 10 wherein the mat heater is positioned under the containment mat and extends generally around the outer periphery of the containment mat.

21. The fluid recapture system of claim 10 further including a berm heating element extending around the periphery of the berm.

22. In combination, a containment mat and a berm for use in a fluid recapture system comprising:

a) a containment mat comprising a first layer of fluid impermeable material mounted on a second layer of base material, the fluid impermeable material being substantially chemically inert;

b) a berm surrounding the containment mat, the berm comprising a generally triangular foam core having an outer core portion and an inner core portion, the inner core portion being approximately twice as wide as the outer core portion;

c) an inside batten bar located adjacent the inner core portion to secure the containment mat and the foam core in place; and d) a vacuum system located on the containment mat.

23. The combination of claim 22 wherein the foam core is covered with a fluid impermeable, plastic outer cover.

24. The fluid recapture system of claim 22 wherein the containment mat is a tri-polymer alloy of polyvinyl chloride, ELVALOY® and chlorinated polyethylene and the base material is a polyester fabric material.

25. The combination of claim 22 wherein the vacuum system comprises a vacuum hose positioned around a perimeter of the containment mat adjacent the berm and a plurality of pickup heads attached to the vacuum hose, each pickup head having at least one opening therein in fluid communication with the containment mat.

26. The fluid recapture system of claim 25 further including a center hose pickup attached to the vacuum hose, the center hose pickup including an open end so that the center hose pickup can be positioned at any suitable location on the containment mat.

27. The fluid recapture system of claim 22 further including an outside batten bar located adjacent the outside core portion to secure the containment mat and foam core in place.

* * * * *